(12) United States Patent
Seok

(10) Patent No.: US 8,664,814 B2
(45) Date of Patent: Mar. 4, 2014

(54) SWITCHED RELUCTANCE MOTOR

(75) Inventor: Jin Su Seok, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 0 days.

(21) Appl. No.: 13/402,733

(22) Filed: Feb. 22, 2012

(65) Prior Publication Data

US 2013/0076177 A1    Mar. 28, 2013

(30) Foreign Application Priority Data

Sep. 28, 2011  (KR) ........................ 10-2011-0098183

(51) Int. Cl.
   *H02K 1/00*   (2006.01)
(52) U.S. Cl.
   USPC ............................................. 310/71; 310/181
(58) Field of Classification Search
   USPC ....................................... 310/71, 43, 260, 181
   See application file for complete search history.

(56) References Cited

U.S. PATENT DOCUMENTS

| 4,350,914 | A  | * | 9/1982 | Searle ............................ 310/194 |
| 7,038,336 | B2 | * | 5/2006 | Takano ........................... 310/43 |

FOREIGN PATENT DOCUMENTS

| JP | 2000-333395 | 11/2000 |
| JP | 2002-000595 | 1/2002 |
| JP | 2003-018789 | 1/2003 |
| JP | 2003-530057 | 10/2003 |
| JP | 2004-173401 | 6/2004 |
| JP | 2009-023418 | 2/2009 |
| JP | 2010-213415 | 9/2010 |
| JP | 2008-259252 | 10/2010 |
| JP | 2010-259173 | 11/2010 |
| WO | 01/76044 | 10/2011 |

OTHER PUBLICATIONS

Office Action for related KR App. No. 10-2011-0098183 dated Sep. 21, 2012 and its English summary.
Office action dated Jul. 23, 2013 from corresponding Japanese Patent Application No. 2012-032757 and its English summary provided by the clients.

* cited by examiner

*Primary Examiner* — Dang Le
(74) *Attorney, Agent, or Firm* — Ladas & Parry, LLP

(57) ABSTRACT

Disclosed herein is a switched reluctance motor including: a rotor part including a rotor core having a shaft fixedly coupled to the center thereof and a plurality of rotor salient poles formed to be protruded from an outer peripheral surface of the rotor core; a stator part including a stator yoke having the rotor part rotatably received in an inner portion thereof and a plurality of stator salient poles formed to be protruded from the stator yoke in a direction toward the rotor salient poles so as to correspond to the rotor salient poles and having coils wound therearound; and a printed circuit board fixedly coupled to an upper portion of the stator part and including a plurality of ground parts having the coils penetrating therethrough, the coil being wound around the plurality of stator salient poles.

5 Claims, 3 Drawing Sheets

SWITCHED RELUCTANCE MOTOR

CROSS REFERENCE TO RELATED APPLICATION

This application claims the benefit of Korean Patent Application No. 10-2011-0098183, filed on Sep. 28, 2011, entitled "Switched Reluctance Motor", which is hereby incorporated by reference in its entirety into this application.

BACKGROUND OF THE INVENTION

1. Technical Field

The present invention relates to a switched reluctance motor.

2. Description of the Related Art

A switched reluctance motor according to the prior art is configured to include: a stator part including a stator yoke and a plurality of stator salient poles protruded from the stator yoke; and a rotor part including a rotor core and a plurality of rotor salient poles protruded from the rotor core so as to face the stator salient poles and rotatably received in the stator part.

More specifically, the stator salient poles are formed to be protruded at predetermined intervals toward the rotor salient poles in a circumferential direction of an inner peripheral surface of the stator yoke and include coils wound multiple times therearound, wherein the coils receive power from the outside.

In addition, a shaft transferring driving force of the motor to the outside is coupled to the center of the rotor part to thereby rotate together with the rotor part.

In addition, as described above, a concentrated type coil is wound around the stator salient poles. On the other hand, the rotor part is configured of only an iron core without any type of excitation device, for example, a winding of a coil or a permanent magnet.

Therefore, when current flows in the coil from the outside, a reluctance torque moving the rotor part toward the stator salient poles having the coil wound therearound by magnetic force generated from the coil is generated, such that the rotor part rotates in a direction in which resistance of a magnetic circuit is minimized.

As described above, each of the stator salient poles has the coil wound multiple times therearound in order to receive power from the outside to thereby form a single phase.

Here, in order to apply power to each of the coils wound around the stator salient poles, distal ends of the coils should be electrically connected to a printed circuit board applying external power to the coils. However, the scheme according to the prior art in which a complicatedly disposed wiring of the coils is connected to the printed circuit board requires a precise manual operation by an operator, such that a manufacturing cost increases.

SUMMARY OF THE INVENTION

The present invention has been made in an effort to provide a switched reluctance motor including a printed circuit board capable of easily controlling each of phases configuring the switched reluctance motor by independently applying current to each of coils directly coupled to an upper portion of a stator part and wound around stator salient poles.

According to a preferred embodiment of the present invention, there is provided a switched reluctance motor including: a rotor part including a rotor core having a shaft fixedly coupled to the center thereof and a plurality of rotor salient poles formed to be protruded from an outer peripheral surface of the rotor core; a stator part including a stator yoke having the rotor part rotatably received in an inner portion thereof and a plurality of stator salient poles formed to be protruded from the stator yoke in a direction toward the rotor salient poles so as to correspond to the rotor salient poles and having coils wound therearound; and a printed circuit board fixedly coupled to an upper portion of the stator part and including a plurality of ground parts having the coils penetrating therethrough, the coil being wound around the plurality of stator salient poles.

The printed circuit board may include a pad for a passive element formed on an upper portion thereof in order to mount a plurality of passive elements.

The printed circuit board may include a pad for a test formed on an upper portion thereof in order to test the printed circuit board.

The printed circuit board may include an electromagnetic wave filter mounted thereon in order to prevent electromagnetic interference generated due to external power applied to the coils.

The printed circuit board may be provided with circuit patterns electrically connected to the coils penetrating through the ground parts.

An insulating material may be applied to the entire outer peripheral surface of the stator part.

DESCRIPTION OF THE PREFERRED EMBODIMENTS

Figure 1:
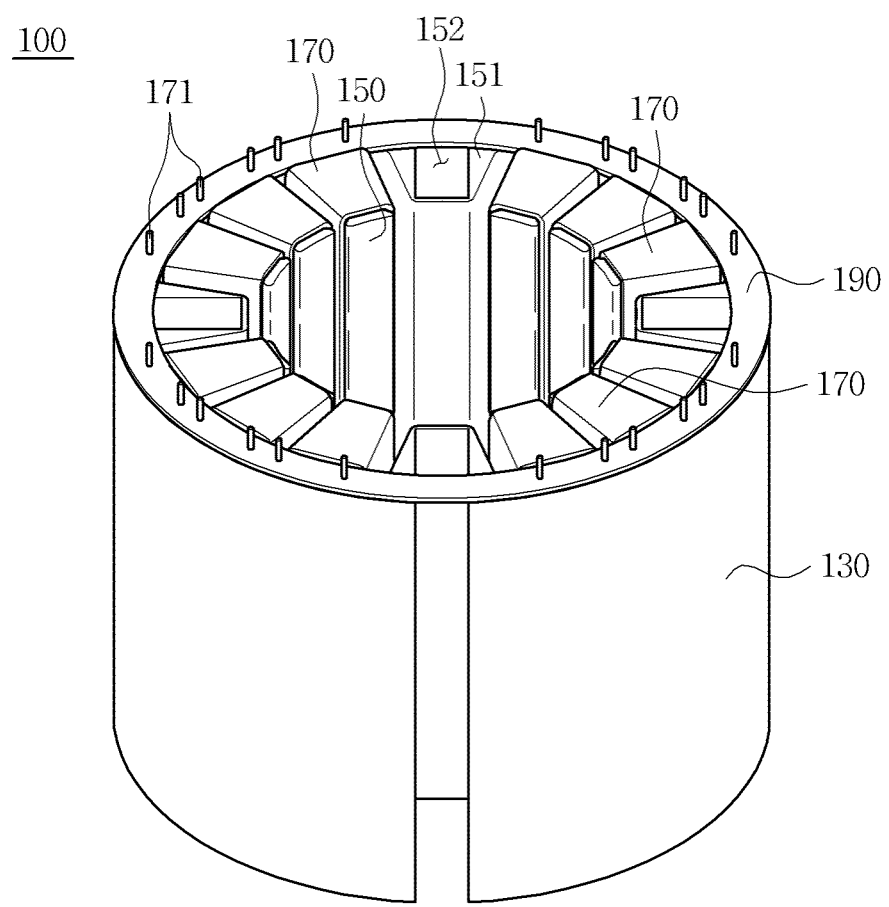
FIG. 1 is an assembled perspective view of a switched reluctance motor according to a preferred embodiment of the present invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 4:
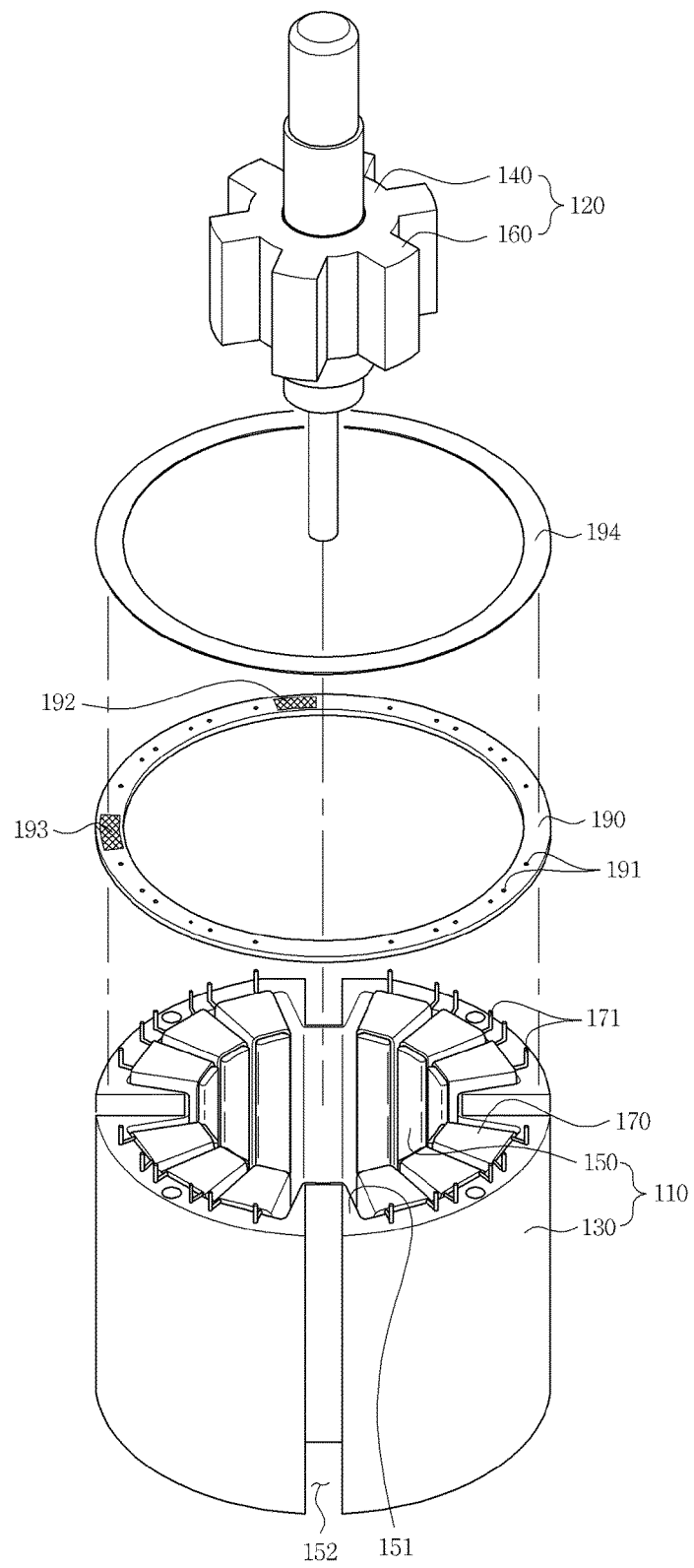
FIG. 4 is an exploded perspective view of the switched reluctance motor shown in FIG. 1.

FIG. 1 is an assembled perspective view of a switched reluctance motor according to a preferred embodiment of the present invention; and FIG. 4 is an exploded perspective view of the switched reluctance motor shown in FIG. 1. As shown, the switched reluctance motor is configured to include: a rotor part including a rotor core and a plurality of rotor salient poles formed to be protruded from the rotor core; and a stator part including a stator yoke and a plurality of stator salient poles formed to be protruded from the stator yoke.

As shown, the center of the rotor core 140 configuring the rotor part 120 is provided with a hollow hole to which a shaft for transferring rotational force of the motor to the outside is fixedly coupled.

Further, the plurality of rotor salient poles 160 are formed to be protruded integrally with each other along an outer peripheral surface of the rotor core 140.

In addition, the rotor core 140 and the rotor salient poles 160 may be made of a metal material so as to generate a reluctance torque.

As shown in FIGS. 1 and 4, the stator yoke 130 configuring the stator part 110 may have a cylindrical shape in which it has a hollow hole formed therein so that the rotor part 120 may rotate.

In addition, the preferred embodiment of the present invention implements a 3-phase switched reluctance motor. As shown, a total of 12 stator salient poles 150 protruded from an outer peripheral surface of the stator yoke 130 are formed.

In addition, outer peripheral surfaces of the stator yoke 130 and the plurality of stator salient poles 150 that configure the stator part 110 may be applied with an insulating material in order to prevent electromagnetic interference with other stator salient poles 150 adjacent thereto.

In addition, according to the preferred embodiment of the present invention, a plurality of auxiliary salient poles 151 provided with a magnet coupling groove 152 in which a plurality of magnets for increasing magnetic force of the stator part 110 may be additionally mounted may be formed to be protruded from the stator yoke 130 so as to face the rotor part 120.

More specifically, three stator salient poles 150 are sequentially formed to be protruded along the outer peripheral surface of the stator yoke 130, and an auxiliary salient pole 151 having a length equal to or shorter than those of the stator salient poles 150 is formed to be protruded.

Therefore, as shown in FIG. 1, four auxiliary salient poles 151 are formed to be protruded from the stator yoke 130. However, according to the preferred embodiment of the present invention, the number of auxiliary salient poles 151 is not limited thereto.

In addition, as shown, in order to configure a single phase, one stator salient pole 150 and another stator salient pole 150 may be disposed on the same line so as to face each other.

Figure 2:
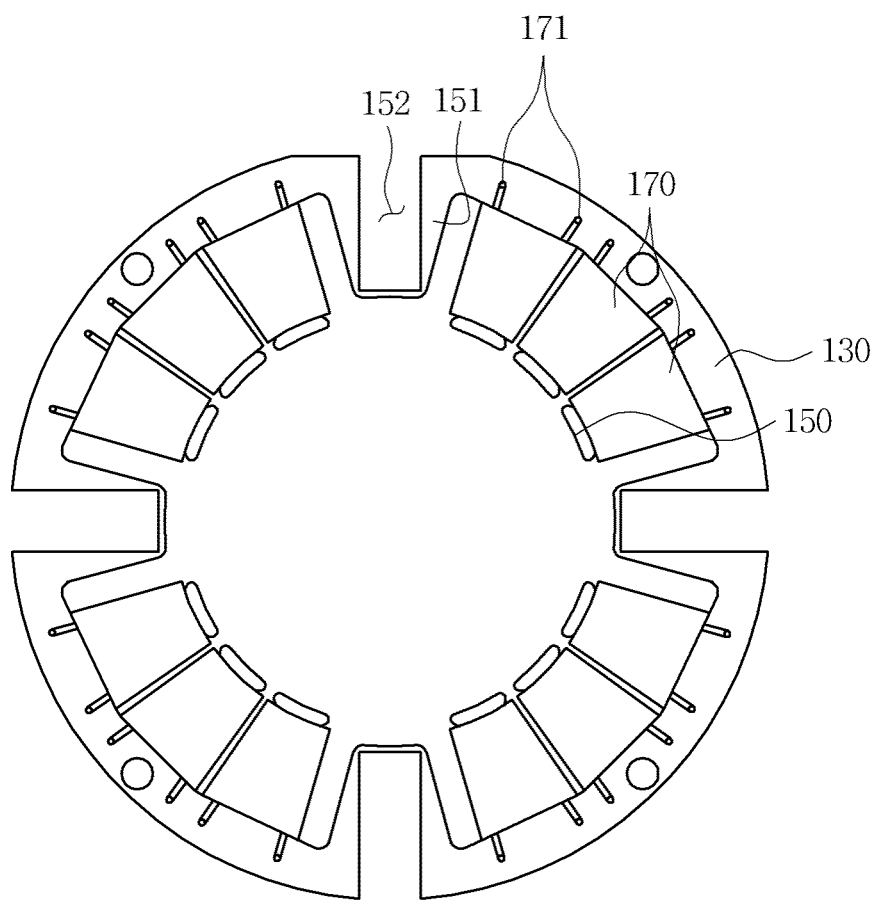
FIG. 2 is a plan view of a stator part configuring the switched reluctance motor shown in FIG. 1.

FIG. 2 is a plan view of a stator part configuring the switched reluctance motor shown in FIG. 1. As shown, each of the stator salient poles 150 has the coil 170 wound multiple times therearound, wherein the coil receives power from the outside.

Figure 3:
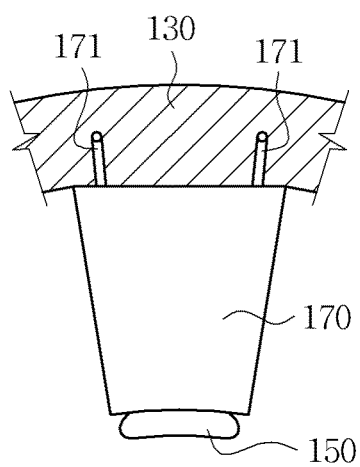
FIG. 3 is a plan view showing a schematic coupling relationship between stator salient poles and coils that configure the switched reluctance motor shown in FIG. 2.

More specifically, as shown in FIG. 3, which is a plan view showing a schematic coupling relationship between the stator salient poles 150 and the coils 170 that configure the switched reluctance motor 100, distal ends 171 of the coils 170 wound multiple times around the stator salient poles 150 are positioned to be protruded in a direction in which a printed circuit board 190 to be described below is coupled.

FIG. 4 is an exploded perspective view of the switched reluctance motor shown in FIG. 1. As shown, the printed circuit board 190 is fixedly coupled to an upper portion of the stator part 110.

More specifically, the printed circuit board 190 includes a plurality of ground parts 191 through which the coils 170 wound around the plurality of stator salient poles 150, that is, distal ends 171 of the coils 170 positioned to be protruded in a direction toward the printed circuit board 190 penetrate.

In addition, the printed circuit board 190 is provided with circuit patterns (not shown) so as to easily control three phases of the switched reluctance motor 100 according to the preferred embodiment of the present invention by independently applying power to each of the coils 170 wound around the stator salient poles 150.

In addition, the printed circuit board 190 may include a pad 192 for a passive element formed on an upper portion thereof in order to mount passive elements.

Further, in addition to the pad 192 for a passive element formed in order to mount the passive element described above, the printed circuit board 190 may include a pad 193 for a test formed on the upper portion thereof in order to test the printed circuit board 190, in the process for manufacturing the switched reluctance motor 100 according to the preferred embodiment of the present invention.

In addition, the printed circuit board 190 may include an electromagnetic wave filter 194 formed on the upper portion thereof in order to prevent electromagnetic interference generated due to external power applied to the coil 170.

Therefore, various passive elements are directly mounted on the upper portion of the stator part 110 configuring the switched reluctance motor 100, thereby making it possible to implement the switched reluctance motor having a size smaller than that of the switched reluctance motor according to the prior art.

In addition, the electromagnetic interference generated due to the external power applied to the coil 170 is primarily shielded in the inner portion of the switched reluctance motor 100 by the electromagnetic wave filter 194 provided on the upper portion of the printed circuit board 190, thereby making it possible to improve reliability of driving of the motor.

The switched reluctance motor according to the preferred embodiment of the present invention uses the printed circuit board capable of independently applying current to coils coupled to an upper portion of a stator part and each wound around the plurality of stator salient poles, thereby making it possible to easily control each of phases configuring the switched reluctance motor.

In addition, since the pad capable of mounting the passive elements or the pad for a test capable of testing an operation of the printed circuit board may be disposed on the upper potion of the printed circuit board, it is possible to implement the switched reluctance motor having a size smaller than that of the switched reluctance motor according to the prior art.

Further, since the electromagnetic wave filter for preventing the electromagnetic interference generated due to the external power applied to the coil may be mounted on the upper portion of the printed circuit board, it is possible to improve the reliability of the driving of the switched reluctance motor.

Although the preferred embodiments of the present invention have been disclosed for illustrative purposes, they are for specifically explaining the present invention and thus a switched reluctance motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A switched reluctance motor comprising:

a rotor part including a rotor core having a shaft fixedly coupled to the center thereof and a plurality of rotor salient poles formed to be protruded from an outer peripheral surface of the rotor core;

a stator part including a stator yoke having the rotor part rotatably received in an inner portion thereof and a plurality of stator salient poles formed to be protruded from the stator yoke in a direction toward the rotor salient poles so as to correspond to the rotor salient poles and having coils wound therearound;

a printed circuit board fixedly coupled to an upper portion of the stator part and including a plurality of through holes having the coils penetrating therethrough, the coil being wound around the plurality of stator salient poles, wherein the printed circuit board includes an electromagnetic wave filter mounted thereon in order to prevent electromagnetic interference generated due to external power applied to the coils; and a plurality of auxiliary salient poles provided with a magnet coupling groove in which a plurality of magnets for increasing magnetic force of the stator part formed in the stator yoke.

2. The switched reluctance motor as set forth in claim 1, wherein the printed circuit board includes a pad for a passive element formed on an upper portion thereof in order to mount a plurality of passive elements.

3. The switched reluctance motor as set forth in claim 1, wherein the printed circuit board includes a pad for a test formed on an upper portion thereof in order to test the printed circuit board.

4. The switched reluctance motor as set forth in claim 1, wherein the printed circuit board is provided with circuit patterns electrically connected to the coils penetrating through the through holes.

5. The switched reluctance motor as set forth in claim 1, wherein an insulating material is applied to the entire outer peripheral surface of the stator part.

* * * * *